Sept. 17, 1957  A. J. GRANBERG  2,806,374
TEMPERATURE COMPENSATING COUPLING
ASSEMBLY FOR LIQUID METERS
Filed May 10, 1954  4 Sheets-Sheet 1

INVENTOR.
ALBERT J. GRANBERG
BY
Bruce & Brosler
HIS ATTORNEYS

Sept. 17, 1957 A. J. GRANBERG 2,806,374
TEMPERATURE COMPENSATING COUPLING
ASSEMBLY FOR LIQUID METERS
Filed May 10, 1954 4 Sheets-Sheet 2

INVENTOR.
ALBERT J. GRANBERG
BY
Bruce & Brosler
HIS ATTORNEYS

Sept. 17, 1957   A. J. GRANBERG   2,806,374
TEMPERATURE COMPENSATING COUPLING
ASSEMBLY FOR LIQUID METERS
Filed May 10, 1954                4 Sheets-Sheet 3
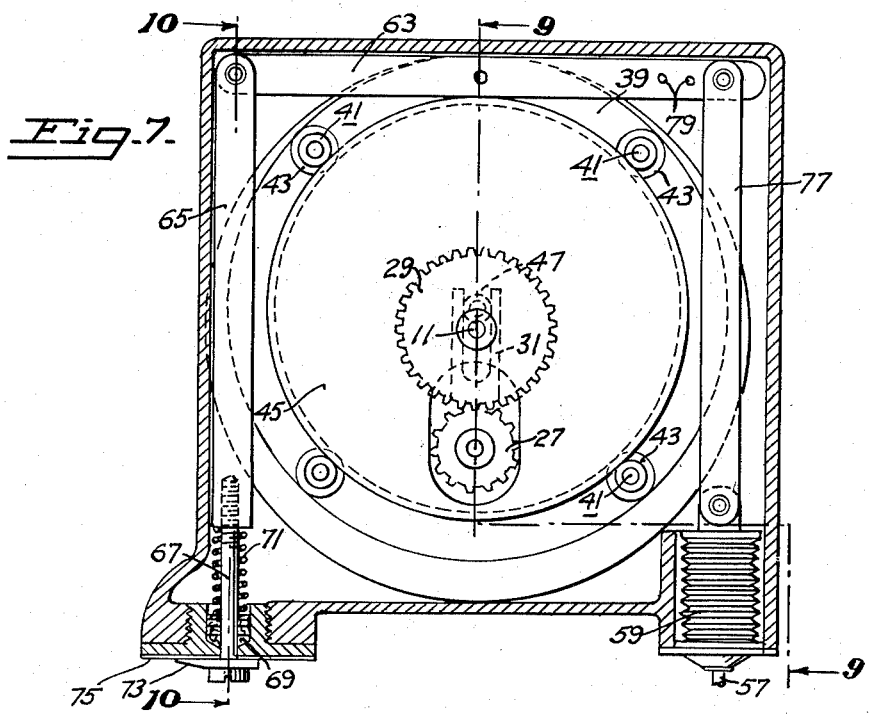
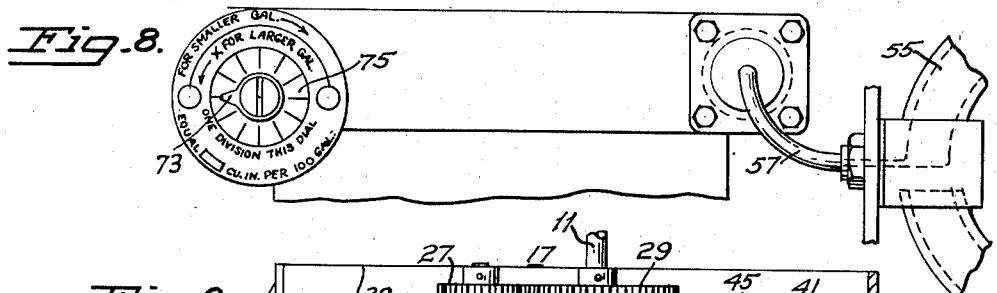
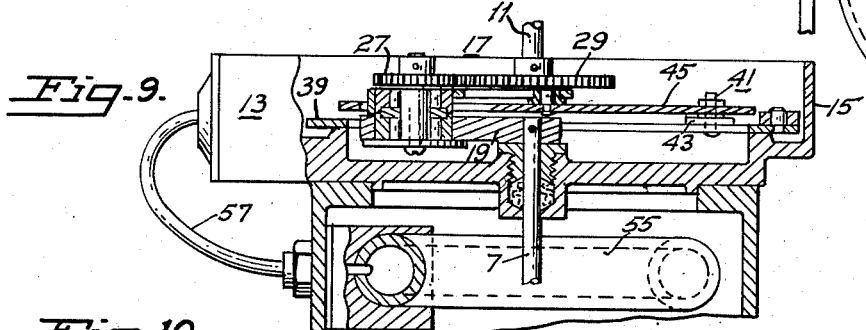
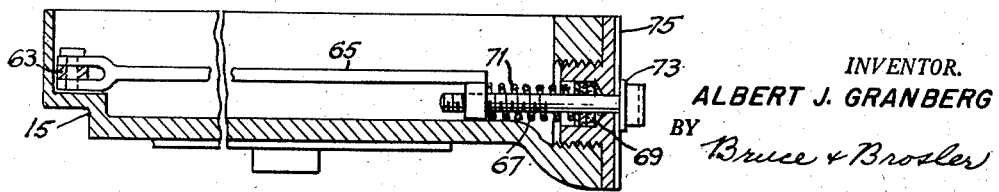
INVENTOR.
ALBERT J. GRANBERG
BY
Bruce & Brosler
HIS ATTORNEYS Sept. 17, 1957 A. J. GRANBERG 2,806,374
TEMPERATURE COMPENSATING COUPLING
ASSEMBLY FOR LIQUID METERS
Filed May 10, 1954 4 Sheets-Sheet 4

INVENTOR.
ALBERT J. GRANBERG
BY
Bruce & Brosler
HIS ATTORNEYS

United States Patent Office 2,806,374
Patented Sept. 17, 1957

2,806,374

TEMPERATURE COMPENSATING COUPLING ASSEMBLY FOR LIQUID METERS

Albert J. Granberg, Oakland, Calif.

Application May 10, 1954, Serial No. 428,771

2 Claims. (Cl. 73—233)

My invention relates to temperature compensating liquid meters and more particularly to a temperature compensating coupling assembly for such meters.

In dispensing liquid such as gasoline, and the like, the volume thereof changes with variations of temperature of the liquid, the degree of change varying with the characteristics of the liquid, such as specific gravity and coefficient of expansion thereof. Unless otherwise provided for, the liquid meter, while measuring accurately in terms of volume, will not indicate true value in terms of volume at a reference temperature.

Thus ten gallons measured at 70 degrees Fahrenheit, when cooled down to some reference temperature, say 60 degrees Fahrenheit for example, will actually be somewhat less than 10 gallons. On the other hand, ten gallons measured at a temperature under the reference temperature, will actually be more than ten gallons at the reference temperature. To assure full value regardless of temperature, it becomes necessary, therefore, to compensate the meter with respect to the reference temperature, so as to always measure a liquid as if it were being dispensed at that temperature.

Among the objects of the present invention are,

1. To provide a novel and improved temperature compensating coupling assembly for liquid meters.

2. To provide a novel and improved temperature compensating coupling assembly for liquid meters, which is capable of adequately altering the speed ratio between the rotating component of the meter and the recording or counting means, in strict accordance with the volumetric changes brought on by temperature changes in the liquid being measured.

3. To provide a novel and improved temperature compensating coupling assembly for liquid meters, which can be adjusted to handle liquids of different specific gravity and different coefficient of expansion, and, 4. To provide a novel and improved temperature compensating coupling assembly for liquid meters, which is structurally easy and economical to manufacture.

Additional objects of my invention will be brought out in the following description of a preferred embodiment of the same, taken in conjunction with the accompanying drawings wherein, Figure 1 is a view in elevation, partly in section, of a liquid meter embodying the present invention;

Figure 7 is a view in plan of a modified version of the temperature compensating coupling assembly of Figure 2;

Figure 8 is a fragmentary view in elevation of the device of Figure 7;

Figure 9 is a view in section through the temperature compensating coupling assembly of Figure 7 taken in the planes 9—9;

Figure 10 is a view in section taken in the plane 10—10 of Figure 7;

Figure 1:
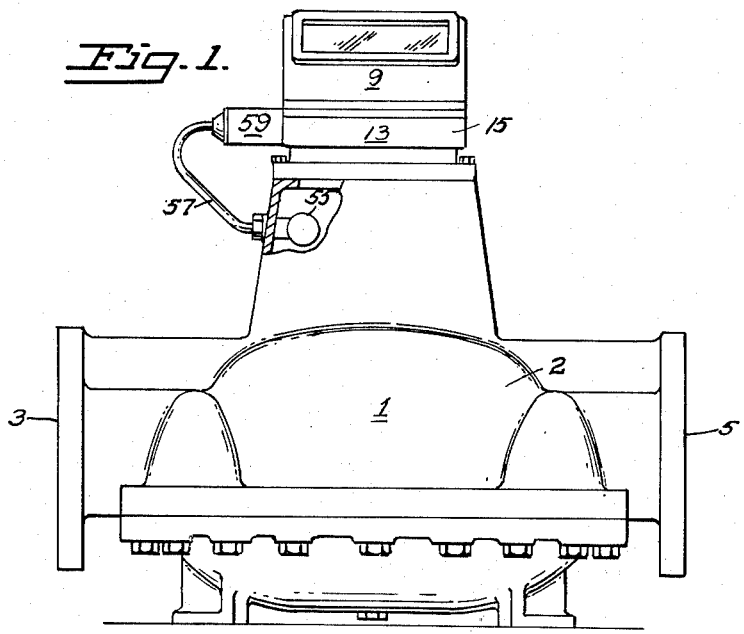

Referring to the drawings for details of my invention in its preferred form, the same has been illustrated as incorporated in a meter 1 of the positive displacement type. Such meter involves a casing 2 having an input opening 3 and an output opening 5, and in such casing is a rotatable assembly (not illustrated) defining a plurality of compartments and constituting the rotatable component of the meter.

This rotatable component includes a meter shaft 7 which extends upwardly on the axis of the rotatable component and serves to transmit the rotational movement of the rotatable component of the meter to a counting mechanism or counter 9 which serves to record the quantity or amount of liquid flowing through the meter.

Such counter includes a counter-shaft 11 which in the absence of temperature compensation could be coupled directly to the meter shaft. However, where temperature compensation is essential, a temperature compensating coupling assembly 13 serves to couple the meter shaft to the counter shaft and alter the speed ratio between such shafts to introduce the necessary compensation factor, thus causing the counter to record the volume of liquid flowing through the meter in terms of what the volume would be at a reference temperature, such as 60 degrees Fahrenheit, for example.

The temperature compensating coupling assembly of the present invention, as applied to a meter of the type illustrated, involves a relative shallow cupped housing 15 mounted on the upper end of the meter casing, such housing being preferably flanged to support the counter which is preferably bolted thereto.

In this housing is a speed change coupling 17 which permits of a slight alteration in rotational speed between the shaft of the meter and that of the counter, in either direction above and below a certain intermediate value which is representative of a reference temperature.

Such speed change coupling includes within the housing, a crank arm 19 mounted at one end on the meter shaft, which extends into the housing through a suitable gland 21.

At its free end, the crank arm carries an overrunning clutch 23 centrally of which is disposed a crank pin 25. This overrunning clutch is adapted to grip the crank pin against counter-clockwise rotation therein, thus permitting rotational movement of the pin on its own axis in a clockwise direction.

A drive connecting means in the form of a gear train, involving a gear 27 on the crank pin, meshing with a gear 29 at the lower end of the counter shaft, couples the upper end of the crank pin to the counter shaft. In the absence of any force tending to produce rotation of the crank pin on its own axis in the clockwise direction, it will be apparent that the gear train will be locked or frozen, and thus function as a solid link connecting the crank pin to the counter shaft. Under this condition, the counter shaft will rotate in the same direction and at the same speed as the meter shaft.

However, any rotation imparted to the crank pin in the clockwise direction will tend to rotate the counter shaft in the reverse direction. If the normal direction of rotation of the meter shaft is clockwise, then it becomes apparent that any slow, but simultaneous rotation of the crank pin in its permissive clockwise direction, will cause a reduction in the clockwise rotation of the counter shaft. Such speed alteration is effected by means responsive to the temperature changes of the liquid passing through the meter.

The temperature responsive means comprises a crank lever 31 having at one end an overriding clutch 33 of similar directional characteristic from that of the first overriding clutch. The clutch end of the crank lever is mounted about the crank pin end, while at its other end, the crank lever is preferably forked to provide an elongated recess 35.

Slidably supported on a circular rib 37 in the lower part of the housing, is a ring 39 on which is mounted a plurality of spaced guide rollers 41 each having a bottom end flange 43 or equivalent washer. Such guide rollers, together, support a disc 45 which has a pivot roller 47 centrally located thereon and which is straddled by the crank lever. Such roller constitutes a pivot about which the crank lever may swing. By shifting the ring as to its position within the housing, this pivot center may be shifted accordingly.

With the pivot roller in line with the meter shaft and the counter shaft, the crank arm and crank lever would swing in unison about a common axis. Under these conditions, the gear train will be locked and a one to one speed ratio will exist between the meter shaft and the counter shaft.

On the other hand, should this pivot center shift from its position of alignment, the centers of rotation for the crank arm and the crank lever will now be out of alignment and the crank lever will no longer rotate in unison with the crank arm, but will swing to the right and left of it, or in other words oscillate with respect to the crank arm and execute a ratchet action, as both rotate about their respective axes.

Figure 6:
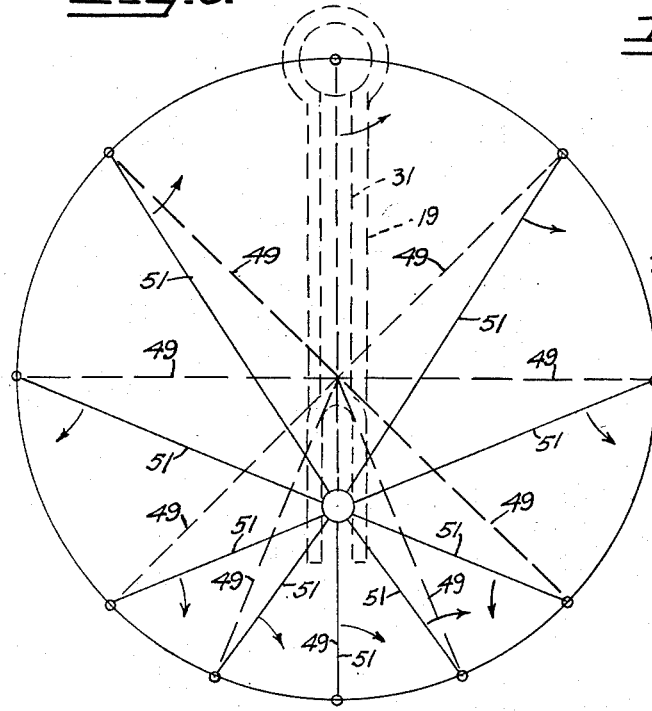
Figure 6 is a schematic diagram depicting the mode of operation of the speed change means of Figure 3.
Figure 4:
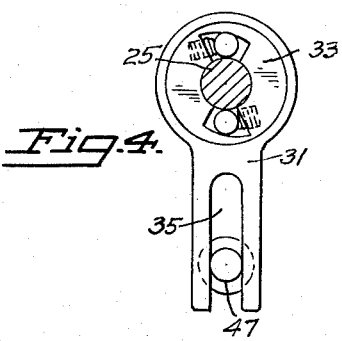
Figures 4 and 5 are components of the speed change means of Figure 3.
Figure 5:
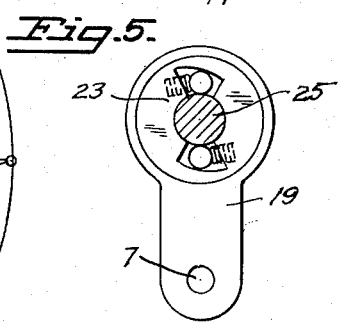
Figure 2:
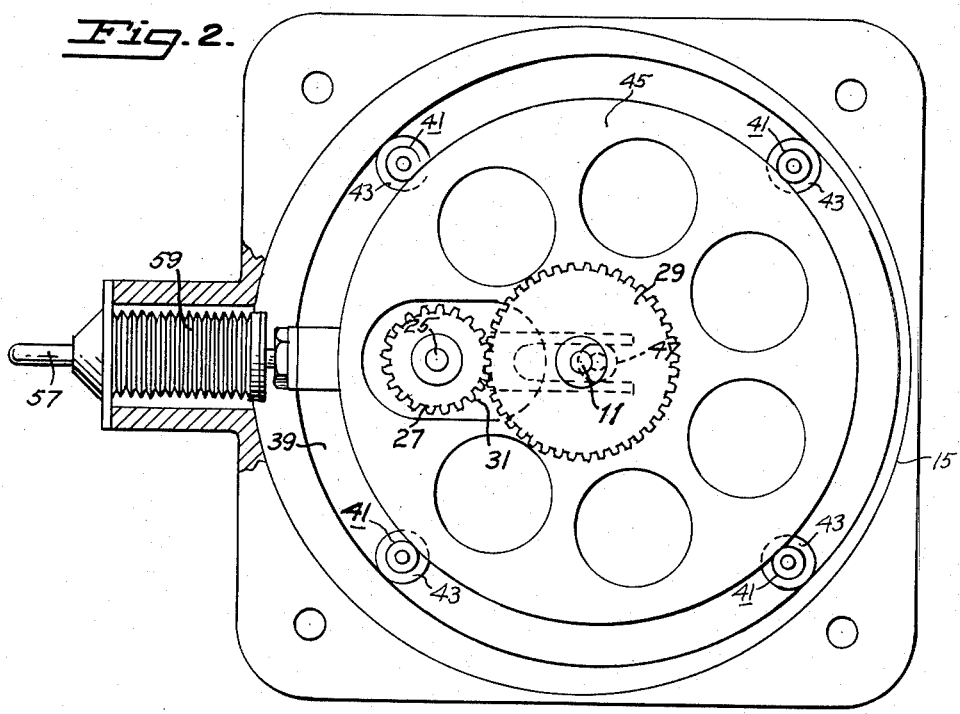
Figure 2 is a view in plan of the temperature compensating coupling assembly incorporated in the meter in Figure 1.
Figure 3:
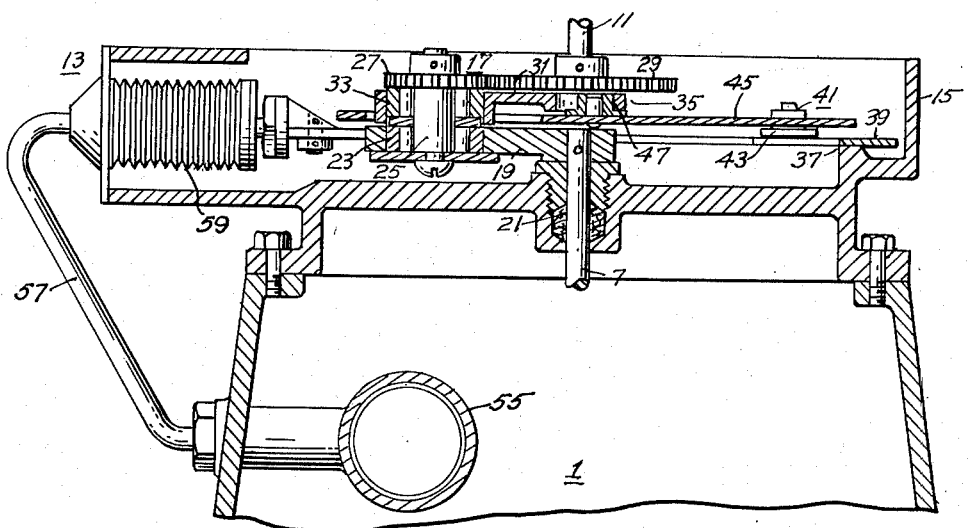
Figure 3 is a view in section through the speed change means forming part of the temperature compensating coupling assembly of Figure 2.
Figure 11:
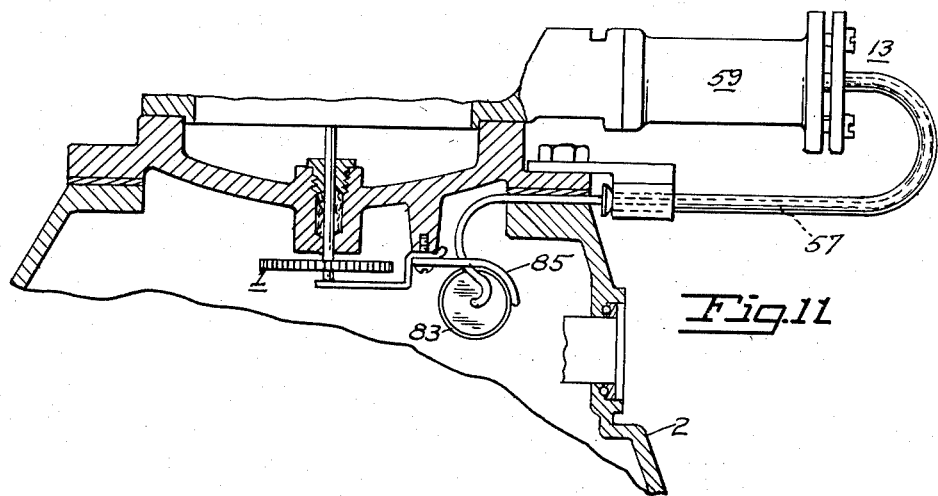
Figure 11 is a fragmentary view of a liquid meter, partly in section, depicting a feature applicable to the embodiments of the invention illustrated in Figures 3 and 7, and related figures.
Figure 12:
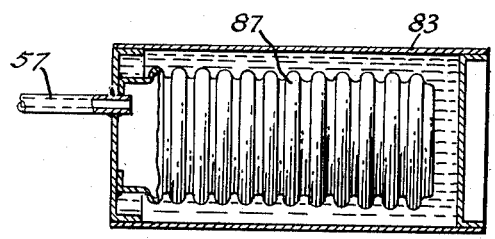
Figure 12 is a view in section of a structural detail of the feature of Figure 11.

This mode of operation will become apparent from an analysis of the diagram of Figure 6, where distances between centers of rotation are greatly exaggerated. The dash line 49 represents various positions of the crank arm 19 as it swings about the shaft axis, while the solid line 51 represents corresponding positions of the crank lever as it swings about its displaced center of rotation. For each complete rotation of the shaft, it will be noted that the crank lever makes one complete oscillation, and in conjunction with the overriding clutches, serves to ratchet the crank pin gear through a small fraction of one revolution for each revolution of the meter shaft. This, in turn, produces a corresponding fractional rotation of the counter shaft in a direction which is reverse to its normal direction of rotation. Therefore, instead of making a complete revolution for each revolution of the meter shaft, the counter shaft makes less than a complete revolution by the amount subtracted therefrom by the ratchet action.

If the extent of shift of the crank lever center of rotation can be accomplished in accordance with temperature changes in the liquid passing through the meter, with reference to a particular temperature, then compensation for temperature changes in the liquid may be realized.

For this purpose, a Sylphon bellows arrangement is utilized, which involves a liquid chamber 55 preferably mounted within the meter casing in contact with the liquid flowing through the meter, such chamber being connected by a small diameter tube 57 to Sylphon bellows 59 mounted within the coupling assembly housing 15 where it is mechanically coupled to the ring 39, which it therefore can shift about in the chamber in response to the expansion or contraction of the bellows.

In setting the compensating coupling assembly for temperature compensation with respect to a particular reference temperature, the reference temperature is considered as an intermediate value in the temperature response range of the Sylphon bellows arrangement. With this range known, the meter is then preferably subjected to the lowest temperature of said temperature range, and while so exposed, the ring 39 is shifted around to locate the pivot center 47 in line with the meter and counter shafts, whereupon the ring is then connected to the bellows. The operating range of the speed change mechanism will then lie to one side of this position of the pivot center. Thereafter, if the meter, including the counter, is properly calibrated to measure accurately at the reference temperature, then at any temperature within the aforementioned range, the counter will indicate values as they would be at the reference temperature.

Thus, were the reference temperature to be 60 degrees Fahrenheit, and the range of temperature from 30 to 90 degrees Fahrenheit, the pivot center will be aligned with the meter and counter shaft at 30 degrees Fahrenheit.

In the direction of increase in temperature from the low value, the pivot center will shift to proportionally increase the effective length of the crank lever, this in turn reducing the speed of rotation of the counter shaft accordingly.

The embodiment of my invention as depicted in Figures 7–10 inclusive, provides for manual adjustment of the Sylphon bellows arrangement to obtain accuracy in the readings of the counter.

The ring 39 instead of being connected directly to the bellows as in the first embodiment, is riveted or otherwise affixed to a lever 63 at an intermediate point thereon.

At one end, this lever is fulcrumed to the extremity of a link 65. This link, in turn, is threadedly coupled to an adjusting screw 67 passing through a gland 69 in the front wall of the coupling assembly housing and held in tension by a spring 71 about the screw and under compression between the wall of the casing and the link. Any rotational adjustment of the screw will produce a corresponding shift of the fulcrum.

An indicating pointer 73 fixed to the screw adjacent the front wall of the casing and adapted to move therewith over a fixed scale 75 on the casing wall, will serve to indicate adjustments of the fulcrum, preferably in terms of volume adjustments in the counter readings.

With the fulcrum in a fixed position, shifting of the ring to accomplish compensation for temperature changes may be realized by coupling the bellows to the free end of the lever 63, which in the embodiment under consideration, is done by means of a link 77, pivoted at one end to the bellows and at its other end to the lever. By providing a series of holes 79 in the lever for selective connection of this link, the leverage may be changed to alter the magnitude of shift of the ring with changes of the bellows in response to temperature variations.

Different liquids have different specific gravities and accordingly different ratios of expansion. Without in any way altering the Sylphon bellows arrangement, I provide for such differences simply by slightly altering the gear ratio of the gears 27 and 29. Thus, the meter can be standardized and caused to function with greater accuracy.

In the interest of even more exacting accuracy, I contemplate providing means for avoiding the probable effect of outside temperature changes on the liquid in the Sylphon bellows. At the present time, this is largely minimized in the construction of the bellows by building into the bellows a core, such as will leave but a small space for the liquid. Thus the degree of bellow expansion or contraction attributed to outside temperature changes would necessarily be of a minor character.

Such probable cause of error may be substantially entirely eliminated by confining the temperature responsive liquid within the casing of the meter in contact only with the liquid flowing through the meter, and utilizing a different liquid or other medium, possessing an extremely low coefficient of expansion, for transmitting the expansive effect of the temperature responsive liquid to the temperature compensating coupling assembly.

With this objective in mind, I confine the temperature responsive liquid, which may be alcohol, to a container 83 mounted within the meter casing 2 by a bracket 85. In this container, is supported a bellows 87 of the Sylphon type, said bellows being connected to the tube 57 which connects to the bellows 59 associated with the temperature compensating coupling assembly. These bellows and connecting tube will contain the liquid of low coefficient of expansion, such as glycerine for example.

With the arrangement just described, any expansion of the liquid in the container within the meter casing, will compress the bellows 87 and thereby bring about an expansion of the bellows 59, and a reverse action occurs with contraction of the liquid surrounding the bellows 87. With respect to the desired operating range of the temperature compensating coupling assembly, it is preferable that the bellows 87 be under some compression at the lower temperature end of such range. This is most readily accomplished by filling the container 83 at a temperature below the desired range of operation, so that when the temperature rises to the minimum value of such range, the resulting expansion of the liquid will partially compress the bellows in question.

From the foregoing description of my invention, it becomes apparent that the same is subject to alteration and modification without departing from the underlying principles involved, and I accordingly do not desire to be limited in my protection to the specific details illustrated and described except as may be necessitated by the appended claims.

I claim:

1. A temperature compensating coupling for coupling a liquid meter shaft and an aligned counter shaft in a rotational speed relationship which will vary with temperature, said coupling comprising a speed-change drive assembly connecting said liquid meter shaft to said counter shaft, said drive assembly including a housing having a gland through which said meter shaft may extend into said housing, a crank arm having means for mounting the same on said meter shaft, a crank pin, means for mounting said crank pin at the free end of said crank arm for rotation therein in one direction only, a gear train coupling said pin to said counter shaft and including a gear on said crank pin and a gear on said counter shaft, said gear train being normally frozen by said crank pin mounting means in the absence of any means causing rotation of said crank pin in its permitted direction of rotation, and temperature responsive means for imparting a rotational movement to said crank pin about its axis in the permitted direction in accordance with temperature changes in liquid passing through said meter, said temperature responsive means comprising a crank lever, means coupling one end of said crank lever to said crank pin for rotation in one direction, said crank lever having an elongated recess at its other end, a ring surrounding said crank arm and lever assembly and slidably supported in said housing, a plurality of guide rollers mounted on and spaced about said ring, each such roller having a bottom end flange, a disc rotatably supported on said flanged rollers, said disc having a pivot roller centrally located thereon and within said crank lever recess, and means exposable to the liquid flowing through such meter and connected to said ring for shifting said pivot roller transversely of the axis of said shafts in accordance with temperature changes.

2. A temperature compensating coupling for coupling a liquid meter shaft and an aligned counter shaft in a rotational speed relationship which will vary with temperature, said coupling comprising a speed-change drive assembly connecting said liquid meter shaft to said counter shaft, said drive assembly including a housing having a gland through which said meter shaft may extend into said housing, a crank arm having means for mounting the same on said meter shaft, a crank pin, means for mounting said crank pin at the free end of said crank arm for rotation therein in one direction only, said means comprising an overrunning clutch with said pin centrally disposed therein, a gear train coupling said pin to said counter shaft and including a gear on said crank pin and a gear on said counter shaft, said gear train being normally frozen by said overrunning clutch in the absence of any means causing rotation of said crank pin in its permitted direction of rotation, and temperature responsive means for imparting a rotational movement to said crank pin about its axis in such direction in accordance with temperature changes in liquid passing through said meter, said temperature responsive means comprising a crank lever having at one end an overriding clutch about said crank pin of opposite directional characteristics to said crank arm overrunning clutch, said crank lever having an elongated recess at its other end, a ring surrounding said crank arm and lever assembly and slidably supported in said housing, a plurality of guide rollers mounted on and spaced about said ring, each such roller having a bottom end flange, a disc rotatably supported on said flanged rollers, said disc having a pivot roller centrally located thereon and within said crank lever recess, and a Sylphon bellows assembly exposable to the liquid flowing through such meter and connected to said ring for shifting said pivot roller transversely of the axis of said shafts in accordance with temperature changes.

References Cited in the file of this patent

UNITED STATES PATENTS

| | | |
|---|---|---|
| 1,356,175 | Swift | Oct. 19, 1920 |
| 1,624,835 | Hatcher | Apr. 12, 1927 |
| 1,881,266 | De Giers | Oct. 4, 1932 |
| 2,156,812 | Hazard | May 2, 1939 |
| 2,438,935 | Marsh | Apr. 6, 1948 |
| 2,535,774 | Armelin | Dec. 26, 1950 |